United States Patent [19]

Nakano et al.

[11] Patent Number: 5,353,338
[45] Date of Patent: Oct. 4, 1994

[54] MULTI-MODE MODEM FOR AUTOMATICALLY SWITCHING BETWEEN DATA TRANSMIT AND CONTROL COMMAND MODES

[75] Inventors: Takahiko Nakano, Ikoma; Shuichi Yoshikawa, Nara, both of Japan

[73] Assignee: Sharp Kabushiki Kaisha, Osaka, Japan

[21] Appl. No.: 869,501

[22] Filed: Apr. 16, 1992

[30] Foreign Application Priority Data

Oct. 25, 1991 [JP] Japan ................................. 3-279947

[51] Int. Cl.$^5$ ........................................... H04M 11/00
[52] U.S. Cl. ........................................ 379/99; 375/8; 375/114
[58] Field of Search ................. 375/8, 121, 114, 107; 379/93, 96–99

[56] References Cited

U.S. PATENT DOCUMENTS

| | | | |
|---|---|---|---|
| 3,825,905 | 7/1974 | Allen, Jr. ............................ | 375/114 |
| 4,549,302 | 10/1985 | Heatherington ..................... | 375/8 |
| 4,700,358 | 10/1987 | Duncanson et al. ................. | 379/97 |
| 4,926,448 | 5/1990 | Kraul et al. ......................... | 375/121 |
| 5,107,518 | 4/1992 | Petty, Jr. ............................. | 379/98 |

FOREIGN PATENT DOCUMENTS 1137852   5/1989   Japan .

*Primary Examiner*—Wing F. Chan
*Attorney, Agent, or Firm*—Nixon & Vanderhye

[57] ABSTRACT

A modem including an identification signal detection section for detecting a specific identification signal during data transmission, a mode switching section for switching the mode from data transmit mode to control command accept mode when the identification signal is detected singly, and an identification signal deleting section for deleting one identification signal from the transmit data when successive identification signals are detected. During data transmission, the mode can be switched over to the control command accept mode by sending a specific identification signal from the data terminal equipment.

6 Claims, 2 Drawing Sheets

MULTI-MODE MODEM FOR AUTOMATICALLY SWITCHING BETWEEN DATA TRANSMIT AND CONTROL COMMAND MODES

BACKGROUND OF THE INVENTION

1. Field of the Invention

The present invention relates generally to a modem, and more particularly, to a modem that enables a host computer or data terminal equipment to communicate via a transmission line.

2. Description of the Prior Art

Host computers and data terminal equipment (hereinafter collectively referred to as the data terminal equipment) are interfaced to transmission lines oftentimes by means of modems. The modem modulates transmit data received from the data terminal equipment and sends out the modulated data to a transmission line. The modem also functions to demodulate signals transmitted from the transmission line, to recover the original data, and to transfer the recovered data to the data terminal equipment, thus enabling communication between data terminal equipment at different locations.

The modem is also capable of accepting input signals from the data terminal equipment as control commands in accordance with which the modem performs control processing such as setting communication protocols. However, since transmit data and control commands are both input to the modem using the same input line from the data terminal equipment, discrimination between the transmit data and control commands is not possible by the input signals only. Therefore, the conventional modem is provided with two modes, one being a control command accept mode for accepting an input signal as a control command and the other being a data transmit mode for accepting an input signal as transmit data, and the modem switches between these two modes according to the situation.

When the modem is in the control command accept mode in which any input signal from the data terminal equipment is accepted as a control command, switchover to the data transmit mode can be easily accomplished by sending a control command for mode switching. However, when the modem is in the data transmit mode, since all input signals from the data terminal equipment are accepted as transmit data, accomplishing the switchover to the control command accept mode is more difficult. For example, even when a specific identification code string is assigned as a control command for mode switching, there always remains the possibility that the transmit data, which can include any data, may contain a data pattern that agrees, even if merely by chance, with the identification code string. Therefore, it has not always been possible in the past to accomplish a reliably distinction between a control command and transmit data.

In conventional modems, one of the following two methods has been used to achieve the switchover from the data transmit mode to the control command accept mode:

(1) A specific identification code string (e.g., "+++") is assigned as a control command, and only when this identification code string is received from the data terminal equipment with a prescribed time (guard time) inserted before and after the code string the modem is switched over to the control command accept mode: or (2) A selector switch (DATA pushbutton switch) is provided on the modem, and when this switch is pressed, the modem is switched over to the control command accept mode. When this switch is pressed again, the modem returns to the data transmit mode.

According to the above method (1) using a specific identification code string, the mode switchover is effected only when the reception of the identification code string is preceded and followed by an interruption of transmission for a prescribed time. This eliminates the possibility of mistakenly effecting the mode switchover even if the same data pattern as the identification code string happens to exist in the data being transmitted. On the other hand, according to the method (2) using a selector switch, since the modem is directly operated by a mechanical means, the mode switchover can be effected in a reliable manner.

However, the above prior art method (1) using a specific identification code string has the problem that it requires the provision not only of a code string detection function for detecting the identification code string contained in transmit data but also of a timer function for measuring the prescribed time inserted before and after the identification code string, which leads to an increase in the manufacturing cost of the modem. Another problem with this method is that, if the mode switchover is to be effected automatically by sending the identification code string by software, etc., the data terminal equipment also is required to have the function of measuring the time, which only complicates the software, etc., although such a problem does not occur when the operator manually operates the data terminal equipment.

On the other hand, the prior art method (2) using a selector switch has the problem that it requires the operator intervention to operate the selector switch. If the operation is to be performed automatically, special hardware has to be provided for both the data terminal equipment and the modem. Therefore, with such method, it is difficult to automate the operation.

In view of the above situation, there is a strong need in the art for a modem that can effect the switchover from data transmit mode to control command accept mode in a simple manner by just sending a specific identification signal from the data terminal equipment.

Accordingly, the present invention overcomes the aforementioned and other shortcomings of the above known and similar devices and methods for providing communication via a modem. The present invention is summarized and described in detail below.

SUMMARY OF THE INVENTION

The modem of this invention, which overcomes the above-discussed and numerous other disadvantages and deficiencies of the prior art, includes an identification signal detection section for detecting a specific identification signal during data transmission, a mode switching section for switching the mode from data transmission to control command accept mode when the identification signal is detected singly, and an identification signal deleting section for deleting one identification signal from the transmit data when successive identification signals are detected. During data transmission, the mode can be switched over to the control command accept mode by sending a specific identification signal from the data terminal equipment.

According to one aspect of the present invention, a modem is provided having two modes, one mode being a control command accept mode for accepting an input signal as a control command and performing prescribed control processing based on the control command, and the other mode being a data transmit mode for accepting an input signal as transmit data and modulating the transmit data for output. More particularly, the modem of the present invention includes identification signal detection means for detecting a specific identification signal appearing singly or successively in the input signal during the data transmit mode, mode switching means for switching the mode from the data transmit mode to the control command accept mode when the identification signal detection means has detected the identification signal appearing singly; and identification signal deleting means for deleting one identification signal and accepting the other identification signal as transmit data when the identification signal detection means has detected two successive identification signals.

The control command accept mode as referred to herein is a mode in which any input signal is accepted as a control command and prescribed control processing is performed as directed by the control command. In this mode, the modem is enabled for control by control commands received from the data terminal equipment. The control commands include, for example, commands for setting communication protocols.

The data transmit mode as referred to herein is a mode in which transmit data is accepted and modulated for output on to a transmission line. In this mode, all input signals in general are directly modulated as transmit data and output on to the transmission line.

In the modem of the present invention, the identification signal detection means constantly monitors the input signals being transmitted from the data terminal equipment to detect the specific identification signal appearing singly or successively. When the specific identification signal is detected appearing singly, the mode switching means switches the mode from the data transmit mode to the control command accept mode. The data terminal equipment can, therefore, switch the modem over to the control command accept mode by just sending the identification signal to the modem, thus accomplishing the mode switching in a simple manner by software, etc., without requiring the provision of special hardware on the data terminal equipment. Furthermore, the modem only needs the addition of simple hardware or software to implement the identification signal detection means, and the mode switching means and does not require the provision of a timer function or other complicated features.

When the identification signal detection means has detected two successive identification signals, the identification signal deleting means deletes one of the identification signals and only accepts the remaining one as transmit data. Therefore, if the data terminal equipment is so configured as to transmit the same pattern as the identification signal twice in a successive manner, a signal of the same pattern as the identification signal can be included in the transmit data for transmission to the transmission line without mistakenly activating the mode switchover so that the transmission can be continued in a normal manner even if the other party on the transmission line is using a conventional modem. When the data to be transmitted contains the same pattern as the specific identification signal, an additional pattern identical to the identification signal must be inserted before or after that pattern before transmission to the modem. However, such processing can be implemented in simple software or hardware, with hardly any increase in the burden for the data terminal equipment.

When a number of patterns identical to the specific identification signal are to be transmitted successively as transmit data, it is only necessary to double the number of patterns to be transmitted to the modem. On the other hand, when the data terminal equipment sends the identification signal specifically intended to switch the modem over to the control command accept mode, the identification signal does not need repetition but is sent singly, ensuring the distinction from transmit data.

Thus, according to the present invention, with a simple function added to the modem, the modem can be switched automatically over from the data transmit mode to the control command accept mode by means of software, etc. from the data terminal equipment. Furthermore, signals of the same pattern as the identification signal can be included in the transmit data by just having the data terminal equipment perform simple processing.

The identification signal detection means, the mode switching means, and the identification signal deleting means can be implemented in hardware or software on the modem.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

Figure 1:
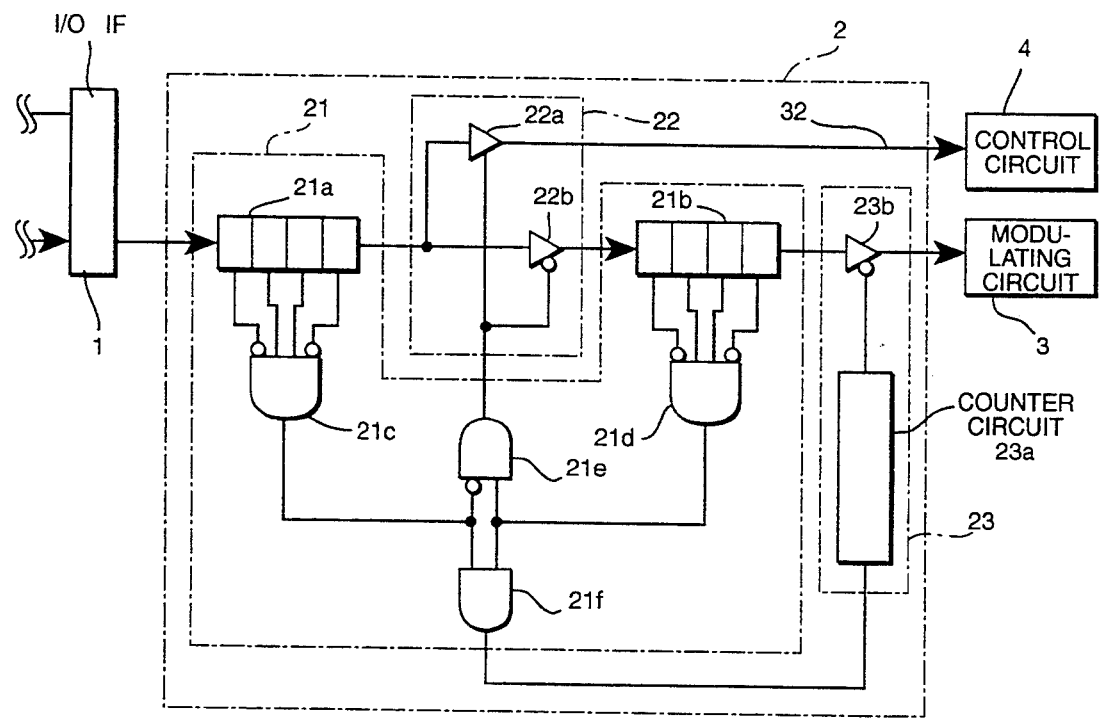
FIG. 1 is a block diagram of an identification signal processing circuit for a modem as shown in FIG. 2 in accordance with the present invention.

The preferred embodiments of the present invention will now be described with reference to the accompanying drawings wherein like reference numeral are used to refer to like elements throughout.

Figure 2:
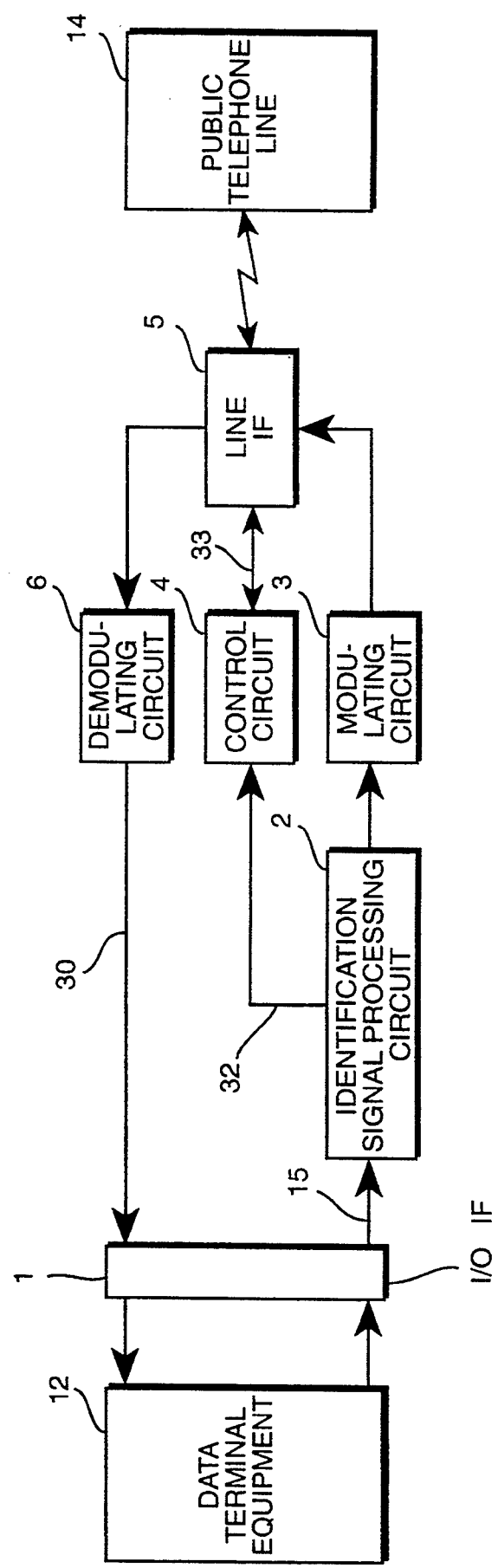
FIG. 2 is a block diagram of the modem according to one embodiment of the present invention.

FIGS. 1 and 2 illustrate a preferred embodiment of a modem according to the present invention. Referring specifically to FIG. 2, a modem 10 is used to interface data terminal equipment 12, such as a personal computer, to a public telephone line 14 or similar transmission line used to communicate data and control commands. It is assumed for purpose of example that "0110" is assigned as a specific identification signal used for mode switching of the modem 10. The data terminal equipment 12 is therefore supposed to append the identification signal "0110" at the end of transmit data to effect switchover from the data transmit mode to the control command accept mode, and, when a pattern identical to "0110" appears in the transmit data, to insert the same pattern after that pattern prior to transmission to the modem 10.

As is shown in FIG. 2, the modem 10 of this embodiment includes an input/output interface 1 through which data is transferred to and from the data terminal equipment 12. The input/output interface 1 is an interface circuit that conforms to the RS232C standard preferably and through which digital signals are transferred serially. An input signal on line 15 is passed through the input/output interface 1 and is transferred via an identification signal processing circuit 2 on to a modulating circuit 3 and a control circuit 4.

The identification signal processing circuit 2 includes, as is shown in FIG. 1, an identification signal detection section 21, a mode switching section 22, and an identification signal deleting section 23. The identification signal detection section 21 is a circuit for detecting the presence of a signal pattern identical to the identification signal "0110" in the input signal transferred from the data terminal equipment 12, and includes two four-stage shift registers 21a, 21b and four logic circuits 21c to 21f. The mode switching section 22 is a demultiplexer that directs the input signal to one of two outputs, i.e. to the modulating circuit 3 via the identification signal detection section 21 and identification signal deleting section 23, or to the control circuit 4. The mode switching section 22 includes two three-state buffers: 22a, a positive logic type; and 22b, a negative logic type. The identification signal deleting section 23, which includes a counter circuit 23a and a negative logic three-state buffer 23b, is a circuit that, when the signal pattern "0110" appears successively in the input signals, deletes the first appearing pattern "0110" as is described in more detail below.

The input signal applied to the identification signal processing circuit 2 is fed initially to the first four-stage shift register 21a in the identification signal detection section 21. The output of the first four-stage shift register 21a is coupled to the control circuit 4 via the three-state buffer 22a in the mode switching section 22. In addition, the output of the first four-stage shift register 21a is coupled to the input of the second four-stage shift register 21b in the identification signal detection section 21 via the three-state buffer 22b.

In the identification signal detection section 21, the parallel outputs from the first four-stage shift registers 21a and the second four-stage shift registers 21b are coupled to the respective inputs of the logic circuits 21c and 21d which output a high level signal only when the input signal entered to the respective four-stage shift registers 21a and 21b represents the identification signal "0110". When the output of the logic circuit 21c is low and the output of the logic circuit 21d is high, the logic circuit 21e outputs a high level signal which is fed to the respective control inputs of the three-state buffers 22a and 22b in the mode switching section 22. Therefore, the mode switching section 22 normally directs the signal entered from the first four-stage shift register 21a to the second four-stage shift register 21b in the identification signal detection section 21, but when the input signal fed into the second four-stage shift register 21b represents the pattern "0110", the mode switching section 22 directs this input signal to the control circuit 4, thus enabling the mode of the modem 10 to be switched over from the data transmit mode to the control command accept mode.

On the other hand, when the outputs of the logic circuits 21c and 21d are both high, the logic circuit 21f in the identification signal detection circuit 21 outputs a high level signal which is fed to the counter circuit 23a in the identification signal deleting section 23. When the high level signal is received from the logic circuit 21f, the counter circuit 23a sends a high level signal to the control input of the three-state buffer 23b for four bits of the input signal, i.e., the number of bits in the identification signal. Therefore, the identification signal deleting section 23 normally transfers the signal entered from the second four-stage shift register 21b in the identification signal detection section 21 directly to the modulating circuit 3. But when the signals entered to the first four-stage shift register 21a and the second four-stage shift register 21b both represent the pattern "0110", the identification signal deleting section 23 deletes one of the two "0110" patterns (i.e., the first in time) and transfers the remaining one (i.e., the second in time) to the modulating circuit 3.

The functions of the identification signal processing circuit 2 can be implemented in either software or hardware as will be appreciated.

The modulating circuit 3 is a circuit that modulates a digital input signal for transformation into an analog signal as is conventional. Referring again to FIG. 2, the output of the modulating circuit 3 is connected to a line interface 5. The line interface 5 is an interface circuit for interfacing to a public telephone line 14 and transfers the analog signal supplied from the modulating circuit 3 onto the public telephone line 14. The line interface 5 also works to transfer an analog signal transmitted from the public telephone line 14 to a demodulating circuit 6, a circuit for transforming the analog signal back into the original digital signal. The reconstructed digital signal is transferred to the data terminal equipment on line 30 through the input/output interface 1.

The control circuit 4 is a circuit that interprets a control command input signal on line 32 as a control command and controls the modulating circuit 3, the demodulating circuit 6, and the line interface 5 as directed by the control command via control lines represented by line 33. A network control unit (NCU) for automatic data transmission and reception is contained in the control circuit 4. The control circuit 4 also has the function of sending the execution result of the control command in the form of an output signal to the data terminal equipment through the input/output interface 1 ( connection not shown ).

We will now explain the operation of the thus constructed modem 10. In the control command accept mode, the mode switching section 22 in the identification signal processing circuit 2 directs all input signals to the control circuit 4 so that the control circuit 4 accepts all the input signals as control commands. Therefore, in this mode, various controls can be performed on the modem 10 by sending control commands from the data terminal equipment 12. Also, the modem 10 can be switched over from this mode to the data transmit mode in a simple manner, i.e. by sending a control command for dialing out when the public telephone line 14 is not connected and by sending a control command for mode switching when the public telephone line 14 is connected.

In the data transmit mode, the mode switching section 22 in the identification signal processing circuit 2 directs all input signals to the second four-stage shift register 21b in the identification signal detection section 21. Normally, these input signals are transferred unchanged to the modulating circuit 3. Therefore, in this mode, all the input signals in general are accepted as transmit data, are modulated by the modulating circuit 3, and are output onto the public telephone line 14 through the line interface 5.

However, in the data transmit mode, if a signal pattern identical to the specific identification signal "0110" is contained singly in the input signal, that is to say the identification signal "0110" is not immediately succeeded by another identification signal "0110", the output of the logic circuit 21*d* is set high when the specific identification signal pattern becomes installed in the second four-stage shift register 21*b* in the identification signal detection section 21 of the identification signal processing circuit 2. As a result, the logic circuit 21*e* sets the mode switching section 22 to the control command accept mode. Thus, the data terminal equipment 12 is only required to send one signal pattern "0110" at the end of the transmit data to switch the modem 10 from the data transmit mode to the control command accept mode. The mode switching can be accomplished in a simple manner by software, hardware, etc. by simply generating the specific identification signal.

If, in the data transmit mode, two successive signal patterns, each representing "0110", are contained in the input signal, the outputs of the logic circuits 21*c* and 21*d* are both set high when these patterns are respectively installed in the first four-stage shift register 21*a* and the second four-stage shift register 21*b* in the identification signal detection section 21 of the identification signal processing circuit 2. As a result, the logic circuit 21*f* is caused to output a high level signal for input to the counter circuit 23*a* in the identification signal deleting section 23. Then, the counter circuit 23*a* controls the three-state buffer 23*b* in such a manner as to delete the subsequently fed four bits of the input signal, so that the two successive "0110" patterns are replaced by a single "0110" pattern for input to the modulating circuit 3.

Therefore, when the transmit data contains a signal pattern identical to the identification signal "0110", the data terminal equipment 12 is made to insert an additional signal of the same pattern to send to the modem 10, the additional signal being thereafter deleted automatically by the modem 10 and thus transferring the original transmit data to the modulating circuit 3. The signals thus transmitted to the public telephone line 14 are completely compatible with the conventional system; therefore, communication is possible without any problem even if the other party at the other end of the public telephone line 14 is using a modem of the conventional type. It will be appreciated that the data terminal equipment 12 can implement the processing of adding the "0110" signal pattern in simple software or hardware without any appreciable increase in the burden for the data terminal equipment.

Thus, according to the present embodiment, only a simple hardware, i.e. the identification signal processing circuit 2, is added to the modem 10 in order to enable the mode to be automatically switched from the data transmit mode to the control command accept mode by software from the data terminal equipment 12 side. Also, by having the data terminal equipment 12 perform a simple processing, a signal of the same pattern as the specific identification signal can be included in transmit data.

In the above embodiment, the detailed description of how the control circuit 4 works to switch over the mode in response to a control command is omitted but will be described below.

In the identification signal processing circuit 2, when the input signal "0110" becomes installed in the second four-stage shift register 21*b* in the identification signal detection section 21, the shift operation of the second four-stage shift register 21*b* is suspended to hold the high-level output of the logic circuit 21*d*, thus latching the mode switching section 22 in the control command accept mode. However, in this case, if the subsequent signal transmitted as a control command from the data terminal equipment 12 contains the same "0110" pattern, the output of the logic circuit 21*c* is also set high when this pattern is installed in the first four-stage shift register 21*a*, causing the mode switching section 22 to switch back to the data transmit mode. Therefore, the "0110" pattern acts as a toggle signal for alternately switching the mode between the data transmit and the control command accept mode. In cases where an undesirable result is expected if the control command accept mode is released by the identification signal, the circuit may be so configured that once the high level output signal is supplied from the logic circuit 21*e* in the identification signal detection section 21, the mode switching section 22 is latched in the control command accept mode and can switch back to the data transmit mode only when a release signal is input from the control circuit 4.

As is apparent from the above description, according to the present invention, a simple function is added to the modem and the data terminal equipment is made to perform simple processing, whereby every input signal from the data terminal equipment can be identified as transmit data or a specific identification signal in a reliable manner, thus accomplishing the mode switching from the data transmit mode to the control command accept mode in a simple manner.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing one or more of the features of patentable novelty that reside in the present invention, including all features that would be treated as equivalents thereof by those skilled in the art to which this invention pertains.

What is claimed is:

1. A modem having at least two modes, one of said at least two modes being a control command accept mode for accepting an input signal as a control command and performing prescribed control processing based on said control command, and another of said at least two modes being a data transmit mode for accepting an input signal as transmit data and modulating said transmit data for output, the modem comprising:

a modulation circuit for receiving said input signal and modulating a carrier signal with said input signal;

a control circuit for interpreting a command input signal; and identification signal processing means directly connected to said modulation circuit and said control circuit, said identification signal processing means including:

identification signal detection means for detecting a specific identification signal appearing singly or successively in said input signal during said data transmit mode;

mode switching means for switching said mode from said data transmit mode to said control command accept mode when said identification signal detection means detects said specific identification signal appearing singly; and identification signal deleting means for deleting one specific identification signal and accepting another specific identification signal as transmit data when said identification signal detection means detects two successive specific identification signals.

2. The modem of claim 1, said identification signal detection means comprising a pair of shift registers.

3. A modem having at least two modes, one of said at least two modes being a control command accept mode for accepting an input signal as a control command and performing prescribed control processing based on said control command, and another of at least two said modes being a data transmit mode for accepting an input signal as transmit data and modulating said transmit data for output, the modem comprising:

a modulation circuit for receiving said input signal and modulating a carrier signal with said input signal;

a control circuit for interpreting a command input signal;

identification signal processing means directly connected to said modulation means and said control circuit, including first register identification means, second register identification means, control means, mode switching means and identification signal deleting means, said first register identification means receiving said input signal and outputting a first signal to said control means, said first signal being at a first level when a specific identification signal is included in said input signal, said second register identification means, during said data transmit mode, receiving said input signal and producing a second to said control means, said second signal being at the first level when said specific identification signal is included in said input signal, and being at the second level when said specific identification signal is not included in said input signal, said second register identification means, during said control command accept mode, holding said specific identification signal and producing said second signal at the first level during said control command accept mode; and control means for receiving said first signal and said second signal, said control means producing a deleting signal when said first signal and said second signal are both at the first level, said control means producing a control command signal when said first signal is at the second level and said second signal is at the first level, said mode switching means receiving a control signal from said control means, when said control signal from said control means is said control command signal during said data transmit mode, said mode switching means switching said data transmit mode to said control command accept mode and outputting said input signal to said control circuit, when said control signal from said control means is said control command signal during said control command accept mode, said mode switching means holding said control command accept mode and outputting said input signal to said control circuit, when said control signal from said control means is not said control command signal during said data transmit mode, said mode switching means switching said control command accept mode to said data transmit mode and outputting said input signal from said first register identification means to said second register identification means, and when said control signal from said control means is not said control command signal during said data transmit mode, said mode switching means holding said data transmit mode and outputting said input signal from said first register identification means to said second register identification means, and said identification signal deleting means receiving said control signal produced by said control means, and when said control signal from said control means is said deleting signal, said identification signal deleting means deleting said input signal from said second register identification means, and when said control signal produced by said control means is not said deleting signal, said identification signal deleting means outputting said input signal from said second register identification means to said modulation circuit.

4. A modem according to claim 3, wherein said identification signal deleting means includes a counter, said counter generating a first level for the number of bits of said specific identification signal when said counter receives said deleting signal from said control means.

5. A modem according to claim 3, wherein said first register identification means includes a shift register having a plurality of registers and receiving said input signal, and a logic means to which said plurality of registers are connected for producing the first signal at the first level when said logic means receives said specific identification signal.

6. A modem according to claim 3, wherein said second register identification means includes a shift register having a plurality of registers and receiving said input signal, and a logic means to which said plurality of registers are connected for producing the second signal at the first level when said logic means receives said specific identification signal.

* * * * *

UNITED STATES PATENT AND TRADEMARK OFFICE
CERTIFICATE OF CORRECTION

PATENT NO. : 5,353,338
DATED : October 4, 1994
INVENTOR(S) : Takahiko Nakano; Shuichi Yoshikawa It is certified that error appears in the above-indentified patent and that said Letters Patent is hereby corrected as shown below:

Column 9, line 28, after "said input signal" insert
--and at a second level when said specific identification signal is not included in said input signal--.

Signed and Sealed this

Twenty-first Day of March, 1995

Attest:

BRUCE LEHMAN

Attesting Officer

Commissioner of Patents and Trademarks